United States Patent [19]

Takematsu

[11] Patent Number: 4,486,690
[45] Date of Patent: Dec. 4, 1984

[54] TEST FLASH DEVICE FOR FLASH DISCHARGER
[75] Inventor: Yoshiyuki Takematsu, Tokyo, Japan
[73] Assignee: Fuji Koeki Kabushiki Kaisha, Tokyo, Japan
[21] Appl. No.: 579,751
[22] Filed: Feb. 14, 1984

Related U.S. Application Data

[63] Continuation of Ser. No. 444,037, Nov. 23, 1982, abandoned.

[30] Foreign Application Priority Data

Nov. 24, 1981 [JP] Japan .................. 56-186994

[51] Int. Cl.³ .......................................... H05B 41/32
[52] U.S. Cl. ...................................... 315/151; 354/415; 354/416; 354/127.1; 354/127.11; 315/241 P
[58] Field of Search ............... 315/151, 159, 241 P; 354/33, 34, 60 F, 127, 128, 139, 145, 415, 416, 471, 127.1, 127.11, 145.1

[56] References Cited

U.S. PATENT DOCUMENTS

| 3,680,457 | 8/1972 | Uno et al. ............... 354/139 |
| 4,012,665 | 3/1977 | Nakamura et al. ........ 315/151 X |
| 4,256,995 | 3/1981 | Ishida ..................... 354/33 X |
| 4,344,680 | 8/1982 | Ishida et al. .............. 354/60 F |
| 4,382,666 | 5/1983 | Ohtaki et al. ............. 354/127 X |
| 4,429,971 | 2/1984 | Mizokami ................. 354/415 |
| 4,444,483 | 4/1984 | Nakajima ................. 354/145.1 X |

FOREIGN PATENT DOCUMENTS 53-84349 1/1978 Japan .

Primary Examiner—David K. Moore
Assistant Examiner—Vincent DeLuca
Attorney, Agent, or Firm—Finnegan, Henderson, Farabow, Garrett & Dunner

[57] ABSTRACT

A test flash device in a photographic flash discharger which includes a photometric circuit including an integrator and exposed to light emitted from a flash discharger tube and reflected by an object to be photographed. A light emission stopping circuit is provided to stop light emission in response to a signal from the photometric circuit. A display circuit is provided to present a change in display when light emission stops. A test flash circuit is provided which regulates the time of light emission during test flashing to a predetermined short time.

4 Claims, 2 Drawing Figures

TEST FLASH DEVICE FOR FLASH DISCHARGER

This application is a continuation, of application Ser. No. 06/444,037, filed Nov. 23, 1982, now abandoned.

BACKGROUND OF THE INVENTION

The present invention relates to photographic flash dischargers, and particularly to a test flash device in which the duration of light emission of a flash discharge tube during test flashing prior to flash photographing is sufficiently short to minimize consumption of energy which is stored in the main discharge capacitor, and thereby to minimize the time required for recharging that capacitor.

Many prior art flash dischargers have automatic light regulators. With these flash dischargers, the quantity of light to be emitted is automatically controlled in accordance with the light reflected on an object to be photographed. Troublesome operation, for example, eye measurement of the distance of the object to be photographed as well as calculation of the diaphragm value based on the object distance may be advantageously eliminated. However, when the object to be photographed is a relatively long distance away, it sometimes occurs that the shutter is released without knowing there is a deficiency of illumination on the object. This occurs when eye measurement of the distance of the object is not performed in preparation for flash photographing and results in an unsatisfactory photograph.

Some known flash dischargers further include a photometric circuit which comprises an integration capacitor and a light emission stopping circuit as the automatic light regulating device. The photometric circuit is exposed to light reflected by the object to be photographed and photoelectrically converts this light to a signal which is integrated by the capacitor. The light emission stopping circuit is activated in response to a signal generated when the integration value of said capacitor has attained a predetermined level.

It has been proposed to provide a display device adapted to present a change in display which is operatively associated with the automatic light regulating device which will indicate that the automatic light regulating device is activated and that the object to be photographed is adequately illuminated even when the object is a long distance away. In these known flash dischargers, test flashing is performed prior to flash photographing and the display device is observed. When a change in display is observed, flash photographing can be performed. When no change in display occurs, the camera diaphragm is regulated to obtain a larger aperture and/or the camera is brought closer to the object to be photographed before another test flash is performed. Flash photographing can be performed only after a change in display is observed.

It will be understood that the flash dischargers described above help determine proper illumination of an object to be photographed prior to actual flash photographing and advantageously reduce the possibility of failure in flash photography even when the object is relatively far away. However, test flashing is performed prior to flash photography and largely consumes the energy stored in the main discharge capacitor. Thus, many known flash dischargers are disadvantageous in that they make it impossible to achieve flash photographing immediately after test flashing.

Specifically, test flashing to determine proper illumination of the object to be photographed when the object is a relatively long distance away requires a correspondingly large quantity of light to be emitted which results in substantial consumption of the energy stored in the main discharge capacitor. Accordingly, flash photographing cannot be performed until the main discharge capacitor is adequately recharged.

Such a restriction that actual photographing cannot be performed until the main discharge capacitor is adequately recharged presents a serious inconvenience for practical use. Even if test flashing indicates that an object to be photographed is sufficiently illuminated, it may occur that the object to be photographed moves during recharging of the main discharge capacitor causing a deficiency of illumination at the time actual flash photographing is performed.

SUMMARY OF THE INVENTION

The object of the present invention is to overcome the aforementioned drawbacks by shortening the time of light emission required for each test flashing and thereby substantially reducing the consumption of energy stored in the main discharge capacitor during test flashing so that flash photographing may be performed immediately after test flashing.

In accordance with the present invention, the test flash device includes a photometric circuit including an integrator and exposed to light emitted from a flash discharge tube and reflected by an object to be photographed, a light emission stopping circuit adapted to stop light emission from the flash discharge tube in response to a signal from the photometric circuit, a display circuit adapted to present a change in display when light emission stopping occurs, and a test flash circuit adapted to provide test flashing prior to flash photographing, the test flash device comprising a circuit to regulate the time of light emission by the flash discharge tube to a predetermined short time, and a circuit to regulate the capacity of the integrator in the photometric circuit depending upon the time of light emission by the flash discharge tube.

The present invention further provides comparators in the flash discharger adapted to compare the signal from the photometric circuit with a reference signal and to provide an output signal for activating the light emission stopping circuit such that said reference signal may be given depending on the predetermined short light emission time of the flash discharge tube.

The other features and advantages of the present invention will be apparent from reading the following description of preferred embodiments of the present invention when considered in conjunction with the accompanying drawings.

DETAILED DESCRIPTION

Figure 1:
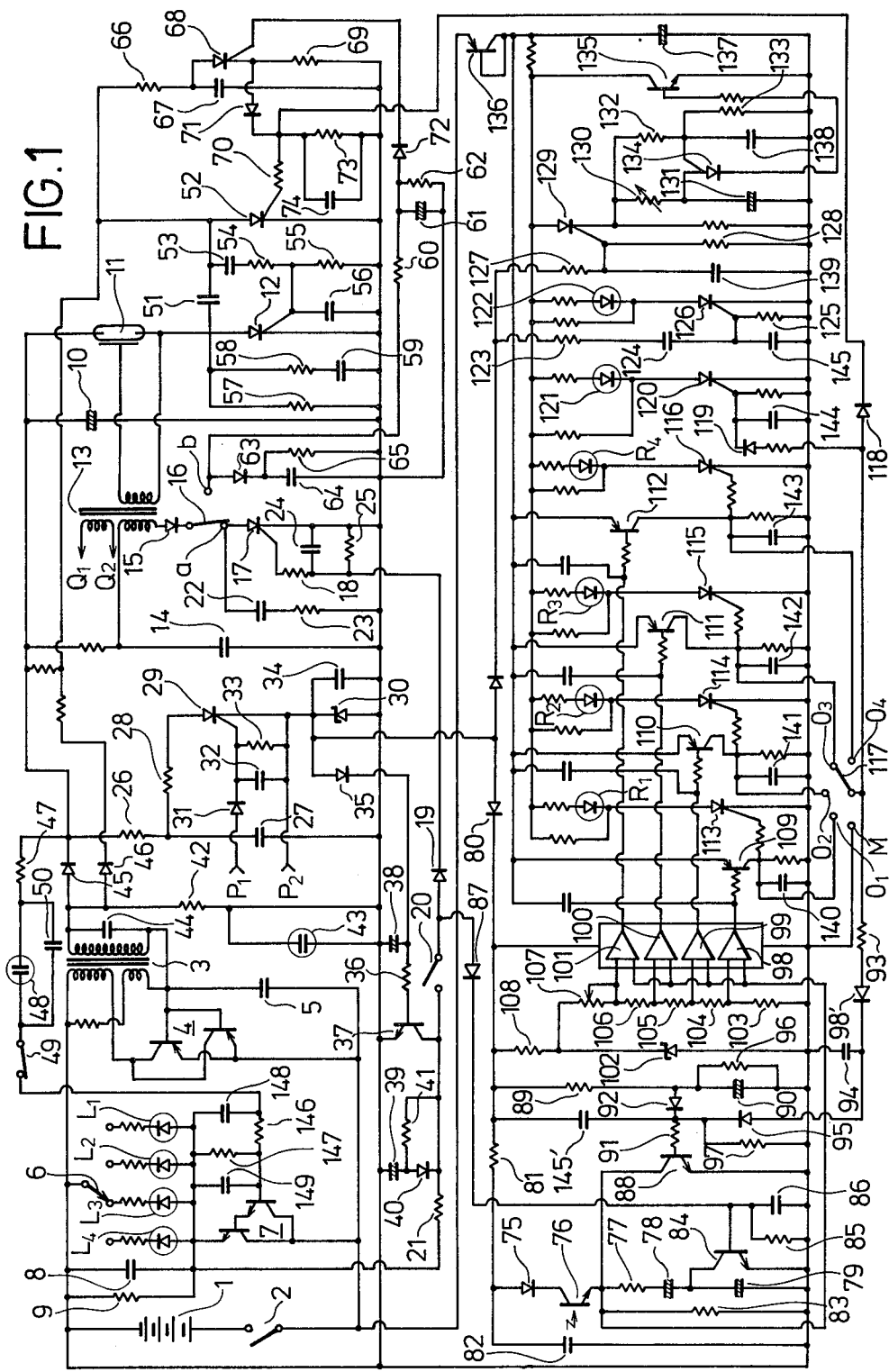
FIG. 1 is a circuit diagram of a photoflash discharger provided with a test flash device according to a preferred embodiment of the present invention.

Reference will now be made to FIG. 1 which shows a DC-DC converter comprising a source battery 1, a source switch 2, a transformer 3 which serves as an oscillator, a transistor circuit 4, and a stabilizing capacitor 5.

Reference symbols $L_1$, $L_2$, $L_3$ and $L_4$ designate light emitting diodes which are arranged in parallel. A change-over switch 6 is adapted to connect a selected one of the diodes $L_1$, $L_2$, $L_3$, $L_4$ to the source battery 1 through a Darlington circuit 7 and thereby cause the selected diode to be lighted.

The light emitting diodes $L_1$, $L_2$, $L_3$, $L_4$ are selected to be lit in accordance with a preset value of the camera diaphragm in preparation for flash photographing, e.g., the light emitting diode $L_1$ is selected when the camera diaphragm has been preset to F=2.8, the light emitting diode $L_2$ is selected when the camera diaphragm has been preset to F=4, the light emitting diode $L_3$ is selected when the camera diaphragm has been preset to F=5.6 and the light emitting diode $L_4$ is selected when the camera diaphragm has been preset to F=8. It should be understood that the Darlington circuit 7 may be replaced by any other switching circuit capable of performing a similar function.

Reference numeral 8 designates a capacitor for start-up of a trigger circuit and a resistance 9 which functions as a discharge resistance and is connected in parallel therewith. Reference numeral 10 designates a well known main discharge capacitor which is connected to the output side of the DC-DC converter, and a serial circuit comprising a flash discharge tube 11 and an SCR 12 is connected in parallel to the main discharge capacitor 10.

A trigger transformer 13 and a trigger capacitor 14 are connected to a diode 15, a change-over switch 16 and an SCR 17 to form a trigger circuit. A trigger switch 20 is connected via a gate resistance 18 and a diode 19 to the SCR 17 which is adapted to become conductive upon closure of the switch 20 to activate the trigger circuit. The trigger switch 20 is connected through a current limiting resistance 21 to the capacitator 8 for starting-up the trigger circuit.

A capacitor 22 and a resistance 23 are connected in parallel to the SCR 17 and prevent erroneous function. A capacitor 24 and a resistance 25 are connected across the cathode-gate of the SCR 17 and constitute an absorbing circuit for electric noise signals.

The change-over switch 16 is adapted to be operated during test flashing. More specifically, the change-over switch 16 is closed at a terminal a for flash photographing and is closed at a terminal b for test flashing. The trigger transformer 13 is adapted to supply high voltage generated in its secondary coil as an excitation voltage for the flash discharge tube 11. The transformer 13 further includes a tertiary coil which is a part of a photometric source circuit which will be described further below.

The photometric source circuit comprises a resistance 26 and a capacitor 27 connected in parallel to the main discharge capacitor 10, and a resistance 28, an SCR 29, and a Zener diode 30 connected in parallel to the capacitor 27 so that a constant voltage appearing across the terminals of the Zener diode 30 is applied to the photometric circuit and a comparator as will be described later. Opposite terminals $Q_1$ and $Q_2$ of the tertiary coil are respectively connected to junction points $P_1$ and $P_2$ which are drawn out from the cathode and the anode of SCR 29, respectively, so that an induced voltage of the tertiary coil makes the SCR conductive. A diode 31 connected to a gate of the SCR 29 serves for rectification while a capacitor 32 connected across the cathode-gate of the SCR 29 and a capacitor 34 connected in parallel to a resistance 33 and the Zener diode 30, respectively, function to absorb electric noise signals.

A transistor 37 connected via a diode 35 and a resistance 36 to one terminal of the Zener diode 30, a capacitor 38 connected across the base-emitter of the transistor 37, a capacitor 39 connected across the the collector-emitter of the transistor 37, a resistance 40, and a diode 41 constitute a circuit to prevent a chattering of the trigger switch 20.

A neon tube 43 connected via a resistance 42 in parallel to the main discharge capacitor 10 is a discharge indicating lamp adapted to be lit when the capacitor 10 is charged in excess of a predetermined voltage. A capacitor 44 and diodes 45, 46 connected to the output side of the DC-DC converter together constitute a smoothing circuit.

One terminal of the diode 45 included in the smoothing circuit is connected via a resistance 47, a neon tube 48, and a switch 49 to the Darlington circuit 7 so that the neon tube 48 is turned on and off as the output voltage of the DC-DC converter varies.

A commutation capacitor 51 and an SCR 52 are connected to the SCR 12 which also is connected to the flash discharge tube 11. These elements together constitute a flash stopping circuit so arranged that the electric charge stored in the commutation capacitor 51 is applied across the anode-cathode of the SCR 12 as a reverse bias under conduction of the SCR 52, thereby causing the SCR 12 to become non-conductive and light emission from the flash discharge tube 11 to stop.

A capacitor 52 and resistances 54, 55 connected in parallel to the SCR 52 on one side, and a capacitor 56 connected in parallel to the resistance 55 on the other side, together constitute a starter circuit for the SCR 12. This starter circuit functions to apply a voltage signal appearing at a junction point of the resistances 54 and 55 to the gate of the SCR 12 and thereby causes the SCR 12 to become conductive. A resistance 57 connected in parallel to the SCR 12 serves as a charging resistance for the commutation capacitor 51, and a serial circuit comprising a resistance 58 and a capacitor 59 similarly connected in parallel to the SCR 12 constitutes a forward biasing circuit for the anode-cathode section of the SCR 12.

A resistance 60 and a capacitor 61 connected to the terminal b of the change-over switch together form a timing circuit. A resistance 62 connected in parallel to the capacitor 61 serves as a discharge resistance while a diode 63 and a capacitor 64 connected to the terminal b establish a discharge path through which the electric charge stored in the trigger capacitor 14 is discharged during test flash. A resistance 65 connected in parallel to the capacitor 64 serves as a discharge resistance.

The timing circuit operates to adjust the quantity of light to be emitted in the operation of test flashing to a contact level and, specifically, functions to limit the time during which light is emitted from the flash discharge tube 11 to a relatively short time, e.g., $\frac{1}{2}$ to $\frac{1}{4}$ of full time light emission. The expression "full time light emission" means the time duration during which, light emission from the flash discharge tube 11 would exhaustively discharge the electric charge stored in the main discharge capacitor 10.

A timing signal from the timing circuit is supplied to a driving circuit which comprises a resistance 66 and a capacitor 67 connected via the diode 46 to the output side of the DC-DC converter, a serial circuit comprising an SCR 68 and a resistance 69 connected in parallel to the capacitor 67, and a diode 71 which together with a gate resistance 70 is inserted between the cathode of the SCR 68 and the gate of said SCR 52. The SCR 68 is caused to become conductive when the timing signal is applied through a diode 72 to the gate of the SCR 68 which causes the electric charge stored in the capacitor 67 to be discharged through the resistance 69. When this occurs a voltage signal appearing on the resistance 69 is applied via the diode 71 to the gate of the SCR 52 which then becomes conductive and activates the flash stopping circuit. A resistance 73 and a capacitor 74 connected across gate-cathode of the SCR 52 constitute an absorption circuit for electric noise signals.

The circuit illustrated in a lower section in FIG. 1 includes a diode 75, a phototransistor 76, a resistance 77 and integration capacitors 78,79 which constitute a photometric circuit to which the terminal voltage of the Zener diode 30 is applied through a diode 80 and a resistance 81. A capacitor 82 connected in parallel to the photometric circuit serves as an absorption capacitor for electric noise signals. A resistance 83 connected in parallel to the integration capacitors 78, 79 serves as a discharge resistance which functions to release the residual charge of the capacitors 78, 79 during charging of the main discharge capacitor 10.

A transistor 84 parallel to the integration capacitor 79 becomes conductive when the trigger switch 20 is closed and thereby short-circuits the capacitor 79. Specifically, only the integration capacitor 78 functions as an integrator when the trigger switch 20 is closed and flash photographing is performed, but the trigger switch 20 remains open during the test flashing so that both the integration capacitors 78, 70 function as integrators. A resistance 85 and a capacitor 86 connected across base-emitter of the transistor 84 constitutes a biasing circuit adapted to be energized via a diode 87 upon closure of the trigger switch 20.

A transistor 88 connected in parallel to the circuit comprising resistance 77 and integration capacitors 78,79 is adapted to release the electric charge stored in these integration capacitors 78,79 for every operation of light emission. When a bias capacitor 90 has been charged through a resistance 89 to a predetermined voltage, a signal representative of this voltage is applied through a base resistance 91 and a diode 92 to the base of the transistor 88 to cause the latter to become conductive. It should be noted here that this voltage is applied via a diode 95 to the base of the transistor 88 with a timing signal timing circuit comprising a resistance 93 and a capacitor 94. This timing circuit is activated by a flash stopping signal generated by a display circuit, which will be described below so that upon generation of the flash stopping signal, the transistor 88 becomes conductive after a time delay in accordance with a time constant of the timing circuit and releases the electric charge stored in the integration capacitors 78, 79. A resistance 96 connected in parallel to the capacitor 90 serves as a discharge resistance, a resistance 97 serves as a discharge resistance for the capacitor 94, and a diode 98 included in the timing circuit prevents reverse flow.

An integration signal appearing between the phototransistor 76 and the resistance 77 of the photometric circuit is applied to respective terminals of comparators 98,99,100 and 101 for voltage comparison. Resistances 103, 104, 105, 106 and 107 connected in parallel to a Zener diode 102 are adapted to generate references voltages of different stepped levels which are applied to respective terminals of the associated comparators. The respective comparators are energized from the photometric source circuit and the Zener diode 102 is energized via a resistance 108 from the source circuit. Outputs of the comparators 98, 99, 100 and 101 are connected to the bases of respective transistors 109, 110, 111 and 112 which are included in the display circuit so that the transistor connected to the comparator which is activated is thereby turned to the conductive state.

The transistors 109, 110, 111 and 112 are operatively associated with light emitting diodes $R_1$, $R_2$, $R_3$, and $R_4$ to cause the associated light emitting diodes to become lit. When the transistor 109, becomes conductive, a voltage signal generated on the collector resistance is applied to the gate of an SCR 113 which then becomes conductive and lights the light emitting diode $R_1$.

Similarly, when the transistor 110 becomes conductive, an SCR 114 becomes conductive and lights the diode $R_2$; when the transistor 111 becomes conductive, an SCR 115 also becomes conductive and lights the light emitting diode $R_3$; and when the transistor 112 becomes conductive; an SCR 116 becomes conductive and causes the light emitting diode $R_4$ to become lit.

A change-over switch 117 is provided with terminals $O_1$, $O_2$, $O_3$, $O_4$ for automatic adjustment of light and a terminal M provides for manual light quantity adjustment and cooperates with change-over switch 6 to perform the change-over operation. Thus, change-over switch 117 is closed at the terminal $O_1$ when the camera diaphragm has been preset to F=2.8. Similarly, the change-over switch 117 is closed at the terminal $O_2$, $O_3$ and $O_4$ when the camera diaphragm has been preset to F=4, F=5.6 and F=8, respectively.

Comparators 98, 99, 100, 101 are adapted to perform operational comparison in such a manner that signals appearing at the respective terminals $O_1$, $O_2$, $O_3$, $O_4$ of the change-over switch 117 correspond to light emission stopping signals associated with the respective preset values of the camera diaphragm.

The light emission stopping signal generated by the changeover switch 117 corresponds to light emission stopping signals associated with the respective preset values of the camera diaphragm.

The light emission stopping signal generated by the changeover switch 117 is applied to the timing circuit which comprises resistance 93 and capacitor 94 on one side, and to the gate of SCR 52 forming a part of the light emission stopping circuit via a diode 118. The light emission stopping signal thereby activates the light emission stopping circuit and, as a result, the light emission from the flash discharge tube 11 is stopped. The light emission stopping signal is applied through a diode 119 to the gate of an SCR 120 which then becomes conductive and lights a light emitting diode 121. The light emitting diode 121 serves as a display device adapted to indicate activation of the light emission stopping circuit.

A light emitting diode 122 provided closely adjacent the light emitting diode 121 serves as a display device adapted to be lit after the flash discharge tube 11 has been triggered. Energization of a resistance 123, a capacitor 124 and a resistance 125 from the photometric source circuit causes an SCR 126 to become conductive and the light emitting diode 122 to become lit.

All of the light emitting diodes $R_1$, $R_2$, $R_3$, $R_4$, 121 and 122 are turned off under control of a timer circuit which comprises resistances 127, 128 adapted to be energized from the photometric source circuit, an SCR 129 adapted to become conductive upon application of a gate signal input by the resistances 127, 128, a timing circuit comprising a variable resistance 130, a capacitor 131 adapted to be energized when the SCR 129 is conductive, a reference voltage generating circuit energized via the SCR 129 and comprising resistances 132, 133, a PUT 134 adapted to compare the timing circuit voltage and the reference voltage, and a transistor 135 adapted to become conductive upon application of an output signal from the PUT 134 at its base. When the transistor 135 becomes conductive upon activation of the timer circuit, the source circuit for the display circuit including the light emitting diodes is thereby short-circuited so that all of the light emitting diodes R₁, R₂, R₃, R₄, 121 and 122 are turned off.

When the source switch 2 is closed, the display circuit is energized from the source battery 1 via a diode-connected transistor 136. A capacitor 137 connected to the transistor 136 is provided for smooth operation. Capacitors 138, 139 of the timer circuit, capacitors 140 through 145 of the display circuit, and a capacitor 145 connected to the base of the transistor 88 absorb electric noise signals. Resistances 146, 147 and capacitors 148, 149 connected to the input side of the Darlington circuit 7 also provide for smooth operation.

In describing the operation of the flash discharger circuit, it will be understood that, upon closure of the change-over switch 117 at the terminal M, no light emission stopping signal is generated but the flash discharge tube 11 is set to full light emission. Therefore, explanation will be made in reference to automatic light quantity adjustment.

In preparation for flash photographing, the change-over switches 6, 117 are operated for change-over according to the preset value of the camera diaphragm. When the camera diaphragm has been preset to, for example, a value of F=5.6, the light emitting diode L is selected by the change-over switch 6 and the change-over switch 3 is closed at the terminal O₃ as seen in FIG. 1.

Upon closure of the source switch 2, the DC-DC converter begins to oscillate in the well known manner and the respective capacitors 10, 14, 27, 51, 67 are charged. At substantially the same time as the DC-DC converter begins to oscillate, the neon tube 48 is lit and the Darlington circuit 7 becomes conductive. The light emitting diode L thereupon emits light and the trigger circuit starting capacitor 8 is charged.

When the main discharge capacitor 10 has been charged to a voltage higher than the predetermined level, the neon tube 43 is lit indicating that light emission is ready. Then, test flashing is performed to determine whether an object to be photographed is properly illuminated.

In test flashing, the change-over switch 16 may be changed over from terminal a to terminal b causing the electric charge stored in the trigger capacitor 14 to be discharged through the primary coil of the trigger transformer 13, the diode 63, and the capacitor 64, so that initial current flows through the flash discharge tube 11 which has been applied with excitation voltage from the trigger transformer 13. This initial current flows via the commutation capacitor 51 through the starter circuit comprising the capacitor 53 and the resistances 54, 55 on one side, and through the bias circuit comprising the resistance 58 and the capacitor 59 on the other side, so that SCR 12 becomes conductive with the gate signal applied thereto. As a result, the flash discharge tube 11 is applied with the electric charge which has been stored in the main discharge capacitor 10 and emits light.

Upon application of the electric charge from the trigger capacitor 14, the timing circuit, comprising the resistance 60 and the capacitor 61 is activated and, after a predetermined time has elapsed, applies a timing signal to the gate of the SCR 68 which then becomes conductive. Thereupon, the electric charge stored in the capacitor 67 is discharged through the resistance 69 and thus a gate signal is applied to the SCR 52. This causes the SCR 52 to become conductive so that the light emission stopping circuit is activated to stop light emission from the flash discharge tube 11. The time for which the light emission from said flash discharge tube 11 lasts can be set to approximately ¼ of the full time of light emission.

The electric charge stored in the trigger capacitor 14 is discharged through the primary coil of the trigger transformer 13 and a voltage induced in the tertiary coil of the transformer 13 under the influence of the electric charge causes the SCR 29 to become conductive. As a result, the electric charge stored in the capacitor 27 is discharged through the Zener diode 30 and a constant voltage appearing across terminals of this diode 30 is applied to the respective photometric and comparator circuits. Almost simultaneously with generation of this constant voltage, the light emitting diode 122 is lit and the timer circuit including the PUT 134 is activated.

The phototransistor 76 in the photometric circuit is exposed to the light reflected by an object to be photographed which has been illuminated by the test flash and effectuates a photoelectric conversion. The integrating capacitors 78, 79 are charged with this photoelectrically converted current. The trigger switch 20 is maintained open during test flashing and, therefore, the transistor 84 remains non-conductive. Accordingly, an integration capacity $C_b$ is given by $$C_b = \frac{C_1 C_2}{C_1 + C_2},$$

where $C_1$, $C_2$, represent capacities of the integration capacitors 78, 79, respectively.

Integration signals from the integration capacitors 78, 79 are compared by the comparators 98, 99, 100, 101 with the reference voltage. When only the light emitting diode $R_1$ is lit or the light emitting diodes $R_1$, $R_2$ are lit, as a result of this comparison, the object to be photographed is insufficiently illuminated. When the light emitting diodes $R_1$, $R_2$, $R_3$ or $R_1$, $R_2$, $R_3$, $R_4$ are lit, the object is sufficiently illuminated. Such discrimination is achieved by determining whether or not both the light emitting diodes $L_3$ and $R_3$ are lit.

When it has been observed that only the light emitting diode $R_1$ is lit or the light emitting diodes $R_1$, $R_2$ are lit, it is preferred to adjust the camera diaphragm to a correspondingly larger aperture or to perform test flashing again at a shorter distance from the object to be photographed. During such operation, the transistor 88 is applied with the base input from the bias circuit comprising resistance 89 and capacitor 90 and thereby becomes conductive so that the electric charges stored in the integration capacitors 78, 79 are released. After a predetermined time has elapsed, the PUT 134 of the timer circuit becomes conductive and the transistor 135 also becomes conductive so that the display circuit is deenergized and the light emitting diodes $R_1$, $R_2$, 122 are turned off.

When it has been observed that the light emitting diodes $R_1$, $R_2$, or $R_1$, $R_2$, $R_3$, $R_4$ are lit, the light emission stopping signal is generated by the change-over switch 117 and, as a result, the timing signal from the timing circuit comprising resistance 93 and capacitor 94 is applied to the base of the transistor 88, whereupon the latter becomes conductive and releases the electric charges stored in the integration capacitors 78, 79. Light emitting diode 121 is lit upon generation of the light emission stopping signal.

In this manner, after a predetermined time has been elapsed from lighting of the light emitting diodes $R_1$, $R_2$, $R_3$, $R_4$, 121, 122, the timer circuit is activated in a manner similar to that described above causing the display circuit to be deenergized and the light emitting diodes to be turned off.

Once it has been determined during test flashing that the object to be photographed is sufficiently illuminated, flash photographing can then be performed. Light emission from the flash discharge tube 11 for test flashing lasts for only a relatively short time, as described above, so that there is still adequate residual charge in the main discharge capacitor 10 for flash photography. Of the electric charge stored in the main discharge capacitor 10, an extremely small part has been consumed for test flashing. Thus, recharging of this capacitor 10 can be completed in an extremely short time. Accordingly, flash photographing can be performed immediately after test flashing.

In flash photographing, shutter release is made with the change-over switch 16 closed at the terminal a. The trigger switch 20 is closed as the camera shutter is opened and applies a gate signal to the SCR 17. The SCR 17 then becomes conductive and the electric charge stored in the trigger capacitor 14 is released through the primary coil of the trigger transformer 13. Thus, the flash discharge tube 11 is activated to start light emission as described above.

The photometric source circuit operates in the same manner as during test flashing so that the terminal voltage of the Zener diode 30 is applied to the photometric circuit, the comparators, and the timer circuit and generation of the terminal voltage causes the light emitting diode 122 to be lit.

During flash photographing, the transistor 84 is turned to the conductive state and the integration capacitor 79 is short-circuited upon closure of the trigger switch 20. In consequence, the photoelectric current converted by the phototransistor 76 from the light reflected by the object to be photographed flows through the resistance 77, the integration capacitor 78, and the transistor 84, wherein only the integration capacitor 78 functions as the integrator. In this case, the integration capacity $C_a = C_1$. The integration signal generated when the integration capacitor 78 has been charged is compared with the reference voltage in the comparators 98, 99, 100 or 101.

Depending on whether the comparators 98, 99 or 100 provide outputs or the comparators 98, 99, 100 or 101 provide outputs, the transistors 109, 110, 111 or transistors 109, 110, 111, 112 are turned to the conductive state and, accordingly, the light emitting diodes $R_1$, $R_2$, $R_3$ or $R_1$, $R_2$, $R_3$ or $R_4$ are lit.

As a result of such sequential operation, a light emission stopping signal is generated by the change-over switch 117 and this signal is applied as the gate signal to the SCR 52 of the light emission stopping circuit. Thus, light emission from the flash discharge tube 11 is stopped by the light emission stopping circuit which is activated at this moment.

Generation of the light emission stopping signal causes the light emitting diode 121 to be lit and a timing signal provided from the timing circuit comprising resistance 93 and capacitor 94 after a time delay causes the transistor 88 to become conductive thereby releasing the electric charge stored in the integration capacitor 78.

After a predetermined time has elapsed from completion of the operation described above, PUT 134 of the timer circuit provides an output to render the transistor 135 conductive. When this occurs, the display circuit including the light emitting diodes $R_1$, $R_2$, $R_3$, $R_4$, 121 and 122 is deenergized and all of these light emitting diodes are turned off.

In this way a complete operation of flash photography has been achieved. Actual photographing is based on the test flashing which determines that the object to be photographed is illuminated properly, so that there is no failure of photography due to insufficient illumination even when the object to be photographed is a relatively long distance away.

It will be appreciated that the light emission time of the flash discharge tube 11 during test flashing is set to be a predetermined time which is substantially shorter than the full light emission time of the flash discharge tube 11. However, the integration capacity of the photometric circuit during this test flashing is given by the formula:

$$C_b = \frac{C_1 C_2}{C_1 + C_2}$$

Based on this relation, it can be accurately determined whether or not an object to be photographed is sufficiently illuminated.

Test flashing is often required when the object to be photographed is a relatively long distance away and, accordingly, light emission from the flash discharge tube 11 during actual flash photographing of this object continues until the electric charge stored in the main discharge capacitor 10 is substantially totally consumed, i.e., until a state substantially corresponding to full light emission is attained. In accordance with the invention, it is also possible to provide an arrangement such that an automatic light quantity regulating function also may be obtained in flash photographing. In this case, the integration capacitor 78 may generate a predetermined charging voltage as an integration signal.

By this invention, it is possible to determine whether the object to be photographed is sufficiently illuminated even when flashing time in the test flashing operation is relatively short because the circuit is arranged so that the charging voltage generated by the integration capacitor 78 corresponds to the charging voltage of the integration capacitors 78, 79 which function as the integrators during test flashing.

Figure 2:
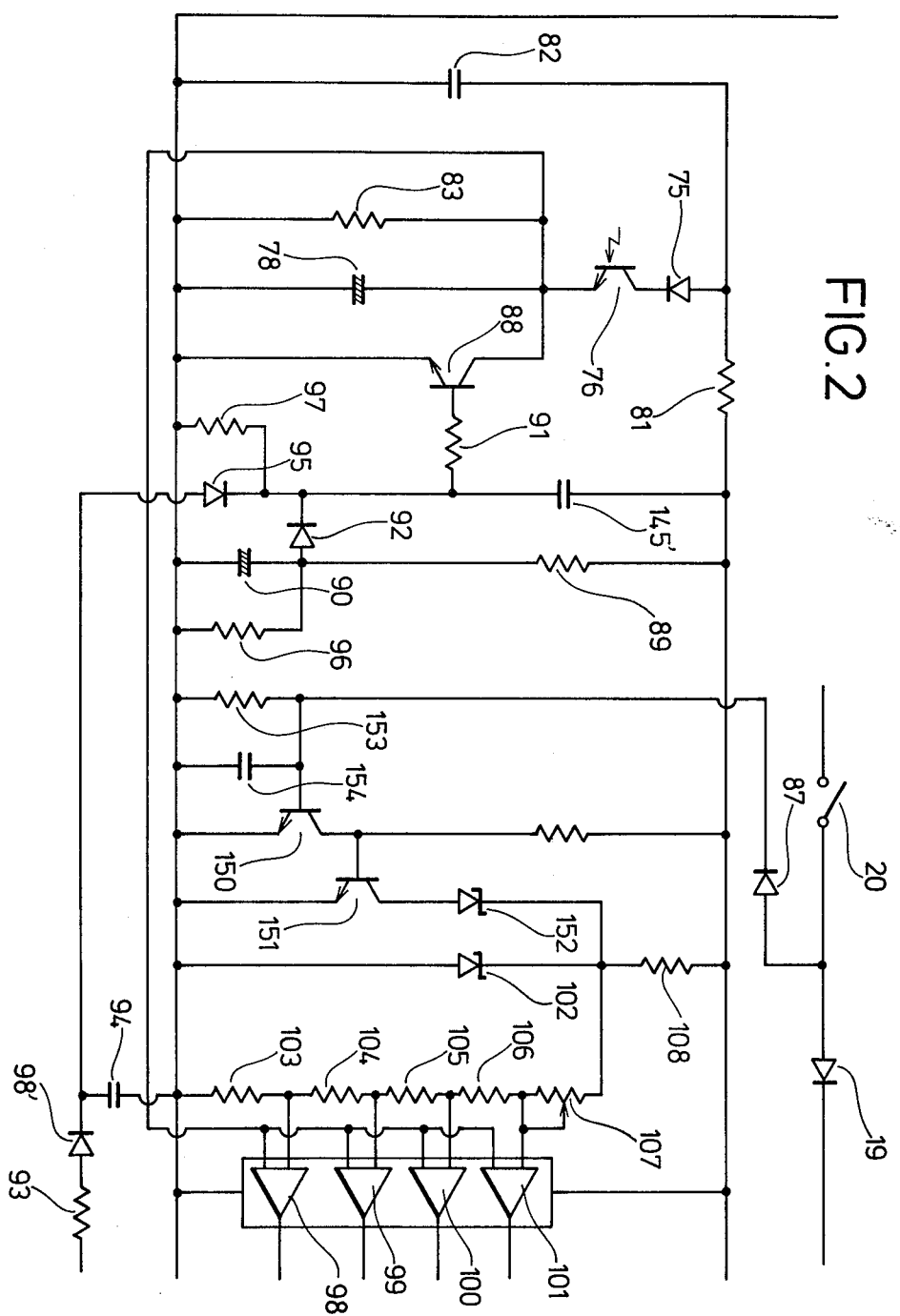
FIG. 2 is a partial circuit diagram of a modified form of the invention.

FIG. 2 is a partial circuit diagram showing another embodiment of the present invention. This circuit diagram corresponds to a modified part of the circuit diagram of the flash discharger shown in FIG. 1 and, therefore, the circuit components or elements common to those in FIG. 1 are designated by the same reference numerals and/or letters.

In the FIG. 2 embodiment, the integration capacitor 79 and the transistor 84 connected is parallel thereto provided in FIG. 1 are eliminated and there is provided a reference voltage converter circuit for the comparators 98, 99, 100 and 101. This converter circuit comprises a transistor 150 adapted to become conductive upon closure of the trigger switch 20, a transistor 151 adapted to become non-conductive, and a Zener diode 152 connected in parallel to the Zener diode 102 and adapted to be energized when the transistor 151 becomes conductive. A resistance 153 and a capacitor 154 form a bias circuit for the transistor 150 and are connected with the trigger switch 20.

In the embodiment of FIG. 2, the transistor 151 is energized from the photometric source circuit and thereby becomes conductive during flashing causing the Zener diode 152 to apply a predetermined reference voltage to the comparators 98, 99, 100 and 101. It should be noted here that the Zener diode 152 has a normal voltage lower than that of the Zener diode 102. For example, the Zener diode 152 may have a normal voltage of 6 volts while the Zener diode 102 may have a normal voltage of 12 volts.

In flash photographing, the transistor 150 becomes conductive upon closure of the trigger switch 20 but the transistor 151 remains non-conductive, so that no electric current flows through the Zener diode 152. Accordingly, a predetermined voltage appearing across the terminals of the Zener diode 102 is applied to the comparators 98, 99, 100 and 101 as the reference voltage.

By adjusting the circuit so that the reference voltage to be applied to the respective comparators depends on the light emission time during test flashing, it is possible to determine whether or not the object to be photographed is properly illuminated by operating the flash discharge tube 11 for as little as $\frac{1}{4}$ to $\frac{1}{2}$ of its full light emission time.

The comparators 98, 99, 100 and 101 may be replaced by any other suitable comparators such as transistor circuits as will be appreciated by those skilled in the art.

The display circuit comprising light emitting diodes $R_1$, $R_2$ $R_3$, $R_4$, 121 and 122 provided in the circuit arrangement of FIG. 1 may be replaced by a display circuit comprising a single light emitting diode 121, adapted to be lit by the output of a suitable comparator which is operable to compare the integration signal and to activate the light emision stopping circuit in response thereto.

It will be understood from the foregoing that the test flash device according to the present invention can determine whether or not an object to be photographed is illuminated properly with a relatively small quantity of light for test flashing, thereby minimizing consumption of the electric charge stored in the main discharge capacitor. As a result, the main discharge capacitor can be recharged in an extremely short time in preparation for actual flash photographing so that test flashing can be followed immediately by flash photographing. Furthermore, the small consumption of electric charge in the main discharge capacitor advantageously leads to reduction in power consumption.

Although the circuit of the present invention described herein includes two integration capacitors 78, 79 connected in series, it is also possible and within the scope of the invention to provide two capacitors of different capacities so that one is connected to the phototransistor 76 during test flashing and the other during the flash photographing.

It will be understood that various additions, substitutions, modifications and omissions may be made to this invention and it is intended that this invention encompass those additions, substitutions, modifications and omissions provided they come with the scope of the appended claims and their equivalents.

What is claimed is:

1. A test flash device in a flash discharger including a flash discharge tube comprising a photometric circuit exposed to light emitted from the flash discharge tube and reflected by an object to be photographed, a light emission stopping circuit adapted to stop said light emission of said flash discharge tube in response to a photometric signal from said photometric circuit, a display circuit adapted to present a change in display when light emission stopping occurs, a test flash circuit adapted to provide test flashing prior to flash photographing, a circuit to regulate the light emission quantity of the flash discharge tube for test flashing to a quantity smaller than that for an actual flash photographing and a circuit to regulate a time integrated by an integrator included in said photometric circuit depending on said light emission quantity for test flashing so that generation of a signal representing a predetermined level of the integration value in said integrator occurs at an earlier point with respect to said actual flash photographing.

2. A test flash device according to claim 1, wherein said test flash circuit includes a timing circuit adapted to be energization-controlled in association with the test flashing and to activate said light emission stopping circuit with a voltage signal of a predetermined value, and said photometric circuit includes two capacitors of different capacities, one of which is selected to operate in association with test flashing.

3. A test flash device according to claim 1, wherein said photometric circuit includes two capacitors connected in series so that one of these capacitors is short-circuited upon closure of a trigger switch for flash photographing and both of the capacitors take part in light measuring during test flashing.

4. A test flash device in a flash discharger including a flash discharge tube comprising a photometric circuit exposed to light emitted from the flash discharge tube and reflected by an object to be photographed, a comparator circuit adapted to generate a signal for activating a light emission stopping circuit when a photometric signal from said photometric circuit exceeds a predetermined value, a display circuit adapted to present a change in display when light emission stopping occurs, a test flash circuit adapted to provide test flashing prior to a flash photographing, a circuit to regulate the light emission quantity of the flash discharge tube for test flashing to a quantity smaller than that for an actual flash photographing and a circuit to regulate a reference signal applied to said comparator depending on said light emission quantity for test flashing.

* * * * *